United States Patent
Karlson et al.

(10) Patent No.: US 10,109,899 B1
(45) Date of Patent: Oct. 23, 2018

(54) CONTROL OF CURRENT IN PARALLEL BATTERY STRINGS

(71) Applicants: GM GLOBAL TECHNOLOGY OPERATIONS LLC, Detroit, MI (US); SPIERS NEW TECHNOLOGIES INC., Oklahoma City, OK (US)

(72) Inventors: Peter T. Karlson, Rochester Hills, MI (US); Bryan Schultz, Oklahoma City, OK (US); David S. Maxwell, Madison Heights, MI (US)

(73) Assignees: GM Global Technology Operations LLC, Detroit, MI (US); SPIERS NEW TECHNOLOGIES INC., Oklahoma City, OK (US)

( * ) Notice: Subject to any disclaimer, the term of this patent is extended or adjusted under 35 U.S.C. 154(b) by 51 days.

(21) Appl. No.: 15/473,684

(22) Filed: Mar. 30, 2017

(51) Int. Cl.
*H01M 10/63* (2014.01)
*H01M 10/613* (2014.01)
(Continued)

(52) U.S. Cl.
CPC ......... *H01M 10/63* (2015.04); *H01M 2/1077* (2013.01); *H01M 10/48* (2013.01); *H01M 10/613* (2015.04); *H01M 10/615* (2015.04); *H01M 10/625* (2015.04); *H01M 10/6556* (2015.04); *H01M 2010/4271* (2013.01); *H01M 2220/20* (2013.01)

(58) Field of Classification Search
CPC .. H01M 10/63; H01M 10/613; H01M 10/615; H01M 10/625; H01M 10/6556; H01M 2/1077; H01M 10/48; H01M 2010/4271; H01M 2220/20
See application file for complete search history.

(56) References Cited

U.S. PATENT DOCUMENTS

2015/0280294 A1* 10/2015 Shin .................... H01M 10/625
429/50
2016/0204478 A1* 7/2016 Iguchi ............... H01M 10/6563
429/62

OTHER PUBLICATIONS

Li, Y and Han, Y, A New Perspective on Battery Cell Balancing: Thermal Balancing and Relative Temperature Control. 2016 IEEE Energy Conversion Congress and Exposition (ECCE), Sep. 2016 [retrieved on Jul. 3, 2018]. Retrieved from the Internet:<URL: https://ieeexplore.ieee.org/document/7854719><DOI:10.1109/ECCE. 2016.7854719 >. >. Url: https://ieeexplore.ieee.org/document/ 7854719>. >.*

\* cited by examiner

*Primary Examiner* — Renee Luebke
*Assistant Examiner* — Paul Baillargeon
(74) *Attorney, Agent, or Firm* — Quinn IP Law (57) ABSTRACT

A battery assembly has a first battery string including a first plurality of cells connected in series. A second battery string is connected in parallel to the first battery string and includes a second plurality of cells connected in series. A fluid channel is operatively connected to the first and the second battery strings and includes a fluid flowing within. A controller is operatively connected to the first and the second battery strings. The controller is configured to determine a desired temperature differential between the first and the second temperatures of the battery strings based at least partially on a respective strength status of the first and the second battery strings. The controller is configured to control the first and the second currents, via the fluid in the fluid channel, based at least partially on the desired temperature differential.

18 Claims, 3 Drawing Sheets

(51) Int. Cl.
*H01M 10/615* (2014.01)
*H01M 10/6556* (2014.01)
*H01M 10/48* (2006.01)
*H01M 10/625* (2014.01)
*H01M 2/10* (2006.01)
*H01M 10/42* (2006.01)

CONTROL OF CURRENT IN PARALLEL BATTERY STRINGS

INTRODUCTION

The present disclosure relates generally to control of current for battery strings connected in parallel. Many uses for electric batteries require multiple dissimilar batteries to be connected in parallel. Batteries connected in parallel may discharge at different rates, with the unequal discharge rates occurring for a variety of reasons.

SUMMARY

A battery assembly includes a first battery string having a first plurality of cells connected in series. The first and the second battery strings are operable at a first temperature and a second temperature, respectively. The first and the second battery strings are configured to produce a first current and a second current, respectively. A second battery string is connected in parallel to the first battery string and has a second plurality of cells connected in series. A fluid channel is operatively connected to the first and the second battery strings and includes a fluid flowing within. A controller is operatively connected to the first and the second battery strings. The controller includes a processor and tangible, non-transitory memory on which is recorded instructions. Execution of the instructions by the processor causes the controller to obtain respective strength status for the first and the second battery strings.

The controller is configured to determine a desired temperature differential between the first and the second temperatures based at least partially on a respective strength status of the first and the second battery strings. The controller is configured to control the first and the second currents, via the fluid in the fluid channel, based at least partially on the desired temperature differential. The respective strength status of the first and the second battery strings includes, but is not limited to at least one of a resistance, a capacity and a state of health.

The assembly may include a heating unit operatively connected to the fluid channel and configured to warm a portion of the fluid to produce a warming fluid. A cooling unit may be operatively connected to the fluid channel and configured to cool another portion of the fluid to produce a cooling fluid. A first mixer may be operatively connected to the fluid channel and configured to mix the warming fluid and the cooling fluid in a first proportion to make a first thermal mixture. A second mixer may be operatively connected to the fluid channel and configured to mix the warming fluid and the cooling fluid in a second proportion to make a second thermal mixture.

A method of controlling the first and second currents produced by the first and second battery strings, respectively, includes commanding the first mixer to direct the first thermal mixture to pass through the first battery string such that heat transfer between the first thermal mixture and the first battery string is enabled. The controller is configured to command the second mixer to direct the second thermal mixture to pass through the second battery string such that heat transfer between the second thermal mixture and the second battery string is enabled.

The assembly may include a pump as a source of the fluid. The heating unit includes a first condenser directly connected to the pump. The cooling unit includes an evaporator directly connected to the pump. An auxiliary circuit, circulating an auxiliary substance between the heating unit and the cooling unit, may include a compressor and a second condenser. The auxiliary substance is configured to be in thermal communication with the fluid but does not physically mix.

The controller includes a thermal management unit configured to control the first proportion such that the first temperature is within a first range defined by a first maximum and a first minimum, and control the second proportion such that the second temperature is within a second range defined by a second maximum and a second minimum. The controller is configured to maintain a relative temperature difference between the first and the second battery strings, thus instead of heating the first battery string, cooling the second battery string to have the same effect.

The assembly may include a first housing configured to enclose the first battery string and a second housing configured to enclose the second battery string. The fluid channel includes a first portion configured to extend through an interior of the first housing, with the first thermal mixture being configured to flow through the first portion. The fluid channel includes a second portion configured to extend through an interior of the second housing, with the second thermal mixture being configured to flow through the second portion. The first portion and the second portion may each define a substantially sinusoidal shape.

The assembly may include at least one sensor operatively connected to the controller and configured to provide sensor feedback. The controller is configured to adjust the first and the second proportions based on the sensor feedback. The at least one sensor may include a first and a second current sensor configured to measure the first and second currents, respectively. The controller may include a closed loop control unit receiving sensor feedback from the first and the second current sensor.

The controller may be configured to adjust the first and second proportions such that the first current and the second current converge. The first and the second battery strings may define a first strength status and a second strength status, respectively. The controller may be configured to adjust the first and second proportions such that the first current is proportional to the first strength status and the second current is proportional to the second strength status.

The above features and advantages and other features and advantages of the present disclosure are readily apparent from the following detailed description of the best modes for carrying out the disclosure when taken in connection with the accompanying drawings.

DETAILED DESCRIPTION

Figure 1:
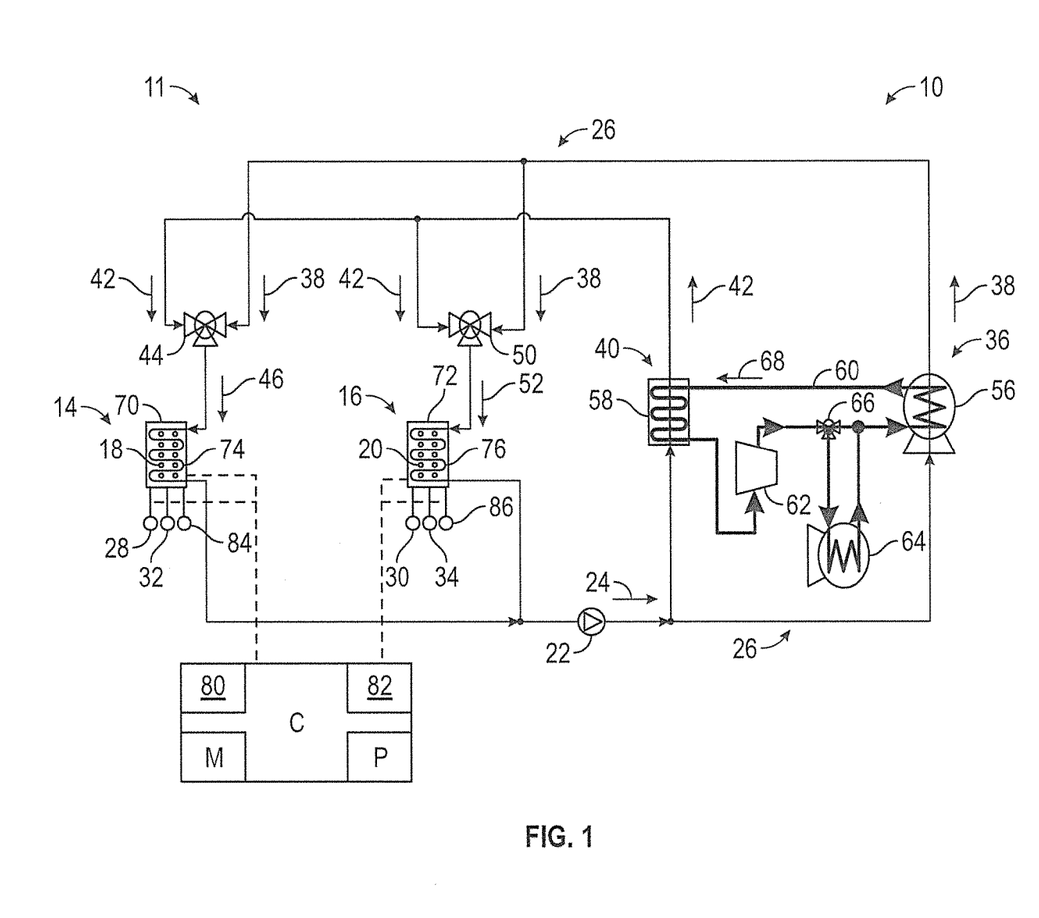
FIG. 1 is a schematic illustration of a battery assembly having a plurality of battery strings connected in parallel and a controller.

Referring to the drawings, wherein like reference numbers refer to like components, FIG. 1 schematically illustrates a battery assembly 10. The assembly 10 may be part of a device 11. The device 11 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation device. The device 11 may be a non-mobile platform and may take many different forms and include multiple and/or alternate components and facilities.

Referring to FIG. 1, the assembly 10 has a plurality of battery strings 12, such as first battery string 14 and second battery string 16, connected in parallel relative to one another. While two battery strings are shown in FIG. 1, it is understood that the number of battery strings may vary based on the application at hand. The first battery string 14 includes a first plurality of cells 18, i.e. individual batteries, connected in series. The second battery string 16 includes a second plurality of cells 20 connected in series. The assembly 10 may include a pump 22 configured to deliver a fluid 24.

Referring to FIG. 1, the fluid 24 is configured to flow within a fluid channel 26 operatively connected to the first and the second battery strings 14, 16. The first and second battery strings 14, 16 are at a first temperature ($T_1$) and a second temperature ($T_2$), respectively, measurable via respective first and second temperature sensors 28, 30. The first and the second battery strings 14, 16 produce a first current and a second current, respectively. A first and a second current sensor 32, 34 is configured to measure the first and second currents, respectively.

Referring to FIG. 1, a controller C is operatively connected to the first and the second battery strings 14, 16. The controller C includes a processor P and tangible, non-transitory memory M on which is recorded instructions for executing a method 100 (discussed in detail below with respect to FIG. 2) for controlling the respective current outputs of the first and second battery strings 14, 16. The memory M can store controller-executable instruction sets, and the processor P can execute the controller-executable instruction sets stored in the memory M. The controller C of FIG. 1 is specifically programmed to execute the steps of the method 100.

Figure 2:
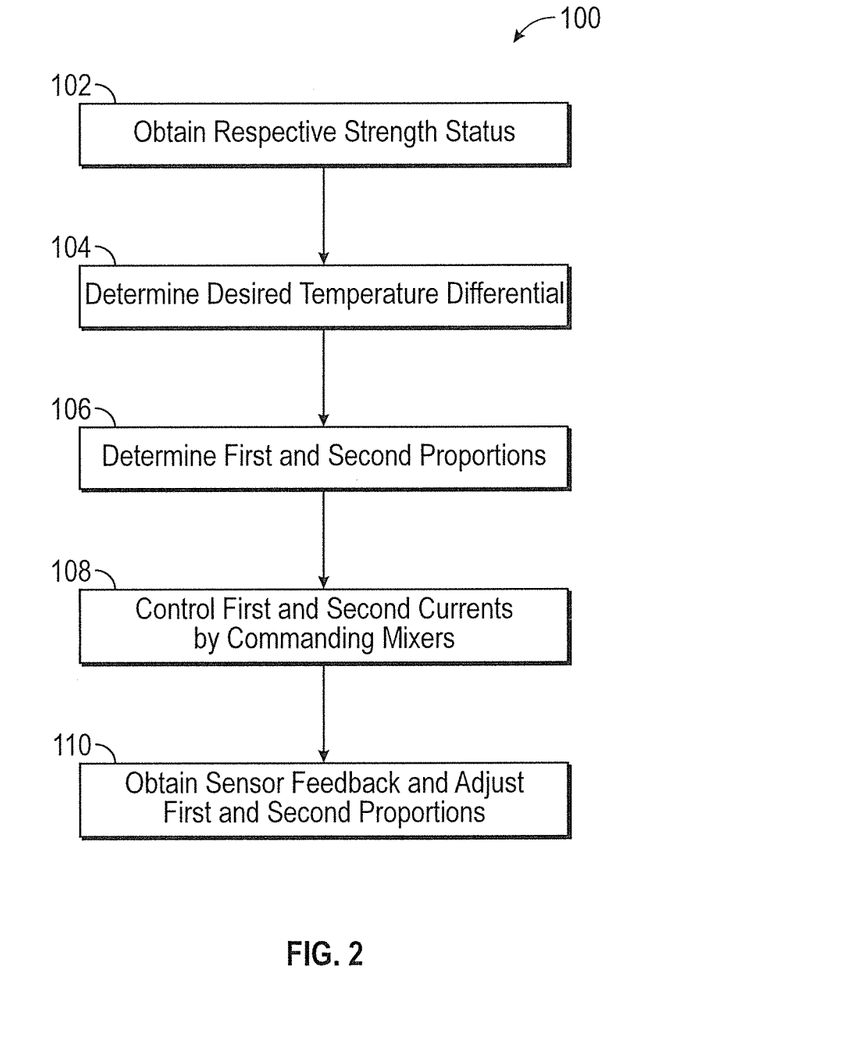
FIG. 2 is a schematic flow diagram for a method executable by the controller of FIG. 1.

The method 100 allows an individually adjustable mixture of the fluid 24 to be passed through the first and second battery strings 14, 16. The method 100 includes adjusting the temperature differential ($T_2-T_1$) between the first and second temperatures ($T_1$, $T_2$) to modify their respective internal resistances and balance their respective current contribution. The internal resistance of a battery is dependent on its size, chemical properties, age, temperature, the discharge current and many other factors. The method 100 provides a technical advantage over a system controlling absolute temperatures. For example, in method 100, instead of heating the first battery string 14, cooling the second battery string 16 may be pursued in order to increase the temperature differential ($T_2-T_1$).

Referring to FIG. 1, the assembly 10 may include a heating unit 36 operatively connected to the fluid channel 26 and configured to warm a portion of the fluid 24 to produce a warming fluid 38. A cooling unit 40 may be operatively connected to the fluid channel 26 and configured to cool another portion of the fluid 24 to produce a cooling fluid 42. Alternatively, the assembly 10 may include a single cooling/heating loop where the first battery string 14 is cooled relative to the second battery string 16 by selectively restricting flow rate. The assembly 10 may include any number of heating and cooling units/loops.

Referring to FIG. 1, a first mixer 44 may be operatively connected to the fluid channel 26 and configured to mix the warming fluid 38 and the cooling fluid 42 in a first proportion (or ratio) to make a first thermal mixture 46. The first thermal mixture 46 is configured to be in fluid communication with the first battery string 14 such that heat transfer between the first thermal mixture 46 and the first battery string 14 is enabled.

Referring to FIG. 1, a second mixer 50 may be operatively connected to the fluid channel 26 and configured to mix the warming fluid 38 and the cooling fluid 42 in a second proportion to make a second thermal mixture 52. The second thermal mixture 52 is configured to be in fluid communication with the second battery string 16 such that heat transfer between the second thermal mixture 52 and the second battery string 16 is enabled. The first and second mixers 44, 50 are operatively connected to the controller C and have respective adjustable valves that function (i.e. allow a portion of warming and cooling fluid to pass through in the first and second proportions, respectively) based on commands from the controller C.

Referring to FIG. 1, the heating unit 36 may include a first condenser 56 directly connected to the pump 22. The cooling unit 40 may include an evaporator 58 directly connected to the pump 22. The heating unit 36 and the cooling unit 40 may be connected via an auxiliary circuit 60. The auxiliary circuit 60 may include a compressor 62, a second condenser 64 and a mixer 66. An auxiliary substance 68 is configured to flow in the auxiliary circuit 60. In one example, the auxiliary substance 68 is a freon.

The auxiliary circuit 60 is configured to be in thermal communication with the fluid channel 26 but is physically separate. In other words, the auxiliary substance 68 does not physically mix with the fluid 24, however, the fluid 24 is warmed or cooled based on the reactions or phase transitions of the auxiliary substance 68. As noted above, the heating unit 36 may include the first condenser 56. The first condenser 56 is configured to condense the auxiliary substance 68 from its gaseous to its liquid state, by cooling it. As the auxiliary substance 68 is condensed, it rejects heat energy. The fluid 24 in the portion of the fluid channel 26 adjacent to the heating unit 36 takes a portion of the rejected heat energy and becomes warmer, producing the warming fluid 38.

As noted above, the cooling unit 40 may include the evaporator 58. The evaporator 58 is used to turn the liquid form of the auxiliary substance 68 into its gaseous form. As the auxiliary substance 68 is evaporated, it takes heat energy away from the portion of the fluid channel 26 adjacent to the cooling unit 40, producing the cooling fluid 42. The evaporator 58 supplies the auxiliary substance 68 (now in a gaseous form) at a low pressure to the compressor 62. Upon being compressed, the temperature and pressure of the auxiliary substance 68 are increased. The auxiliary substance 68 (still in a gaseous form) is delivered to the second condenser 64 at a pressure at which condensation occur (at a predefined temperature). The auxiliary substance 68 is re-circulated to the first condenser 56 and the cycle is repeated.

Referring to FIG. 1, the assembly 10 may include a first housing 70 configured to enclose the first battery string 14 and a second housing 72 configured to enclose the second battery string 16. The fluid channel 26 includes a first portion 74 configured to extend through an interior of the first housing 70, with the first thermal mixture 46 being configured to flow through the first portion 74. As shown in FIG. 1, the first portion 74 may define a substantially sinusoidal shape. The fluid channel 26 includes a second portion 76 configured to extend through an interior of the second housing 72, with the second thermal mixture 52 being configured to flow through the second portion 76. As shown in FIG. 1, the second portion 76 may define a substantially sinusoidal shape.

Referring to FIG. 1, the controller C may include a thermal management unit 80 configured to control the first proportion such that the first temperature ($T_1$) is within a first range defined by a first maximum and a first minimum, and control the second proportion such that the second temperature ($T_2$) is within a second range defined by a second maximum and a second minimum. The first and second maximum may be selected to provide the maximum life span for the first and second battery strings 14, 16.

The method 100 allows control of individual charge and discharge current of the plurality of battery strings 12, so that the strings 12 are charged or discharged at a rate that is optimal for their respective condition, yet still meets the total power and energy demands. The method 100 provides smooth control of total current output of the assembly 10, especially at the end of charge or discharge, which would not be achievable with contactors alone.

Referring now to FIG. 2, a flowchart of the method 100 stored on and executable by the controller C of FIG. 1 is shown. Method 100 need not be applied in the specific order recited herein. Furthermore, it is to be understood that some steps may be eliminated. Referring to FIG. 2, in block 102, the controller C is programmed to obtain respective strength status of the first and second battery strings 14, 16. The respective strength status of the first and the second battery strings 14, 16 includes, but is not limited to, at least one of a state of health, resistance and a capacity. The state of charge of the first and second battery strings 14, 16 may be obtained via state-of-charge sensors 84, 86, shown in FIG. 1. Other estimation methods employed by those skilled in the art may be used. The capacity of the first and second battery strings 14, 16 may be based on the rate of discharge divided by the difference in state of charge. For example, if the first battery string 14 is at an 80% state of charge at an initial time, delivers 10 Ampere hours of charge and is then at 60% state of charge at a final time, the capacity is determined as: 10/(0.8−0.6)=10/0.2=50 Amp hours.

In block 104 of FIG. 2, the controller C is programmed to determine a desired temperature differential between the first and the second battery strings 14, 16, based at least partially on the respective strength status and other factors. For example, the desired temperature differential may be based on predefined respective target currents of the first and the second battery strings 14, 16.

In block 106, the controller C is configured to determine the first proportion and the second proportion based at least partially on the desired temperature differential (from block 104). There are multiple ways to maintain a temperature differential ($T_2-T_1$). For example, the first battery string 14 may be heated or cooled by $X_1$ degrees, while the second battery string 16 may be heated or cooled by $X_2$ degrees, such that ($X_2-X_1$)=($T_2-T_1$). Note that $X_1$ and $X_2$ have positive values for heating and negative values for cooling. In one embodiment, the current balancing control is constrained to operate such that the first temperature is within a first range defined by a first maximum and a first minimum ($T_{1,min}$, $T_{1,max}$), and the second temperature is within a second range defined by a second maximum and a second minimum ($T_{2,min}$, $T_{2,max}$). The respective ranges may be selected to offer the optimal life span for the first and second battery strings 14, 16, respectively. Thus, the controller C may be configured to operate such that:

$$T_{1,min} < (T_1+X_1) < T_{1,max}$$

$$T_{2,min} < (T_2+X_2) < T_{2,max}$$

In block 108, the controller C is configured to control the first and second currents by commanding the first and second mixers 44, 50 to direct the warming and cooling fluids 38, 42 to pass through in the first and second proportions, respectively, (determined in block 106). In other words, the controller C is configured to command the first mixer 44 to direct the first thermal mixture 46 to pass through the first battery string 14 such that heat transfer between the first thermal mixture 46 and the first battery string 14 is enabled. The controller C is configured to command the second mixer 50 to direct the second thermal mixture 52 to pass through the second battery string 16 such that heat transfer between the second thermal mixture 52 and the second battery string 16 is enabled.

In block 110, controller C is programmed to obtain sensor feedback from various sensors (including the first and second temperature sensors 28, 30 and first and second current sensors 32, 34) and adjust the first and second proportions. The controller C may include a closed loop control unit 82 receiving the sensor feedback and adjusting the first and second proportions. The closed loop control unit 82 may be a proportional-integral (PI) control unit configured to continuously calculate an error value as the difference between a desired set-point and a measured process variable. For example, the error value may be the difference between the desired temperature differential and a measured temperature differential (the difference between the measurements obtained by the first and second temperature sensors 28, 30). The closed loop control unit 82 is configured to apply a correction factor based on proportional and integral terms, i.e. accounting for present and past values of the error, and minimize the error over time. For example, if the error is large and positive, the correction will be large and negative.

Figure 3:
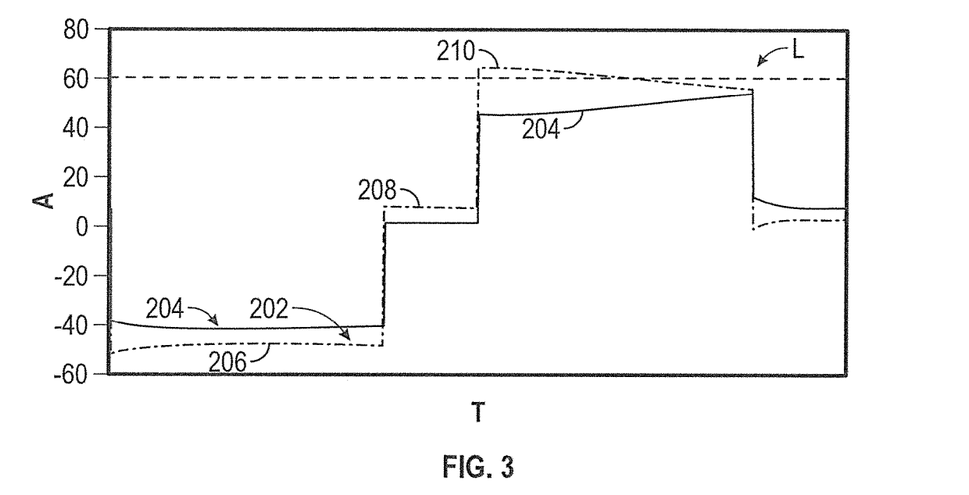
FIG. 3 is a schematic graph of current over time for two battery strings.
Figure 4:
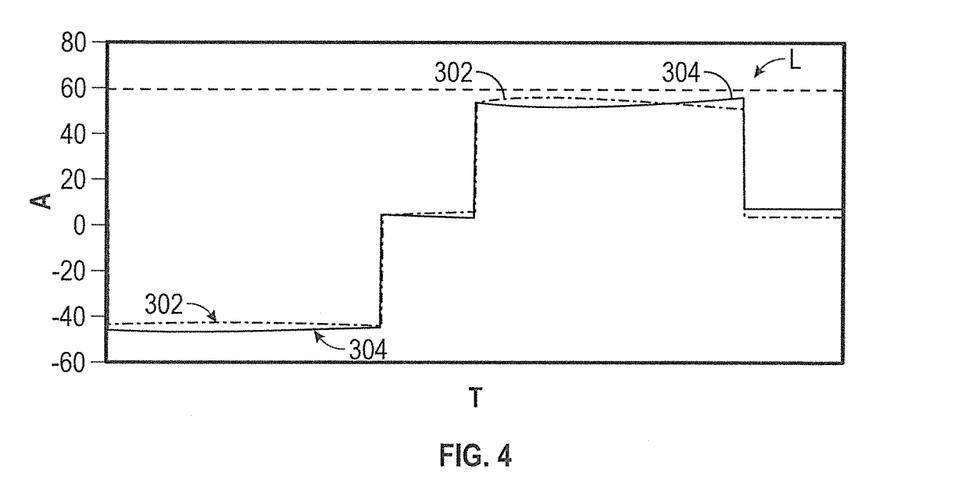
FIG. 4 is another schematic graph of current over time for the two battery strings of FIG. 3.

Referring now to FIGS. 3-4, example graphs of current ("A" in the vertical axis) versus time ("T" in the horizontal axis) are shown for two battery strings, a relatively stronger string 202 and a relatively weaker string 204. The strength status may be based on a state of health or a capacity. The current limit of individual strings is indicated by line L. In FIG. 3, both the relatively stronger string 202 and the relatively weaker string 204 have a temperature of 23° C. With both strings being at an equal temperature, the relatively stronger string 202 sources and sinks more current (see portions 206, 208, respectively). A relatively large difference in state of health between the strings may result in the relatively stronger string 202 breaching the individual current limit indicated by line L (see portion 210).

In the example illustrated in FIG. 4, a relatively stronger string 302 is maintained at 20° C. and a relatively weaker string 304 is maintained at 23° C. As shown in FIG. 4, adjusting the temperature of the relatively stronger string 302 to be 3° C. lower is sufficient to balance the currents and avoid exceeding the individual current limit indicated by line L. The controller C may be configured to adjust the first and second proportions such that the first current and the second current converge, i.e., are about the same. The first and the second battery strings may define a first strength status and a second strength status, respectively. The controller may be configured to adjust the first and second proportions such that the first current is proportional to the first strength status and the second current is proportional to the second strength status.

In summary, the method 100 includes adjusting the temperature differential ($T_2-T_1$) between the first and second temperatures ($T_1$, $T_2$) to modify their respective internal resistances and balance their respective current contribution. This can maximize the power from the assembly 10, which may be limited by the battery string with the highest charge/discharge rate, or maximize energy from the assembly 10, which may be limited by divergence of capacity between the plurality of battery strings 12. By controlling the temperature differential of a plurality of battery strings 12 having dissimilar capacity, their individual contributions can be adjusted to achieve a number of system level goals. Thus, the controller C (and execution of the method 100) improves the functioning of the assembly 10.

The controller C of FIG. 1 may be an integral portion of, or a separate module operatively connected to, other controllers of the device 11. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery assembly comprising:
   a first battery string including a first plurality of cells connected in series, the first battery string operable at a first temperature and configured to produce a first current;
   a second battery string connected in parallel to the first battery string and including a second plurality of cells connected in series, the second battery string being operable at a second temperature and configured to produce a second current;
   a fluid channel having a fluid flowing within, the fluid channel being operatively connected to the first and the second battery strings;
   a controller operatively connected to the first and the second battery strings;
   wherein the controller includes a processor and tangible, non-transitory memory on which is recorded instructions, execution of the instructions by the processor causing the controller to:
      determine respective strength status of the first and the second battery strings;
      determine a desired temperature differential between the first and the second temperatures based at least partially on the respective strength status;
      control the first and the second currents, via the fluid in the fluid channel, based at least partially on the desired temperature differential.

2. The assembly of claim 1, wherein the respective strength status of the first and the second battery strings includes at least one of a state of health, resistance and a capacity.

3. The assembly of claim 1, further comprising:
   a heating unit operatively connected to the fluid channel and configured to warm a portion of the fluid to produce a warming fluid; and
   a cooling unit operatively connected to the fluid channel and configured to cool another portion of the fluid to produce a cooling fluid.

4. The assembly of claim 3, further comprising:
   a first mixer operatively connected to the fluid channel and configured to mix the warming fluid and the cooling fluid in a first proportion to make a first thermal mixture;
   a second mixer operatively connected to the fluid channel and configured to mix the warming fluid and the cooling fluid in a second proportion to make a second thermal mixture;
   wherein the controller is configured to command the first mixer to direct the first thermal mixture to pass through the first battery string such that heat transfer between the first thermal mixture and the first battery string is enabled; and
   wherein the controller is configured to command the second mixer to direct the second thermal mixture to pass through the second battery string such that heat transfer between the second thermal mixture and the second battery string is enabled.

5. The assembly of claim 4, further comprising:
   at least one sensor operatively connected to the controller and configured to provide sensor feedback; and
   wherein the controller is configured to adjust the first and the second proportions based on the sensor feedback.

6. The assembly of claim 5, wherein:
   the at least one sensor includes a first and a second current sensor configured to measure the first and second currents, respectively; and the controller includes a closed loop control unit receiving the sensor feedback from the first and the second current sensor.

7. The assembly of claim 5, wherein:
the controller is configured to allow a maximum power extracted from the first and the second battery string; and
the controller is configured to adjust the first and the second proportions such that the first current and the second current converge.

8. The assembly of claim 5, wherein:
the first and the second battery strings define a first strength status and a second strength status, respectively; and
the controller is configured to adjust the first and the second proportions such that the first current is proportional to the first strength status and the second current is proportional to the second strength status.

9. The assembly of claim 5, wherein the controller includes a thermal management unit configured to:
control the first proportion such that the first temperature is within a first range defined by a first maximum and a first minimum; and
control the second proportion such that the second temperature is within a second range defined by a second maximum and a second minimum.

10. The assembly of claim 4, further comprising:
a first housing configured to enclose the first battery string;
wherein the fluid channel includes a first portion configured to extend through an interior of the first housing, the first thermal mixture being configured to flow through the first portion;
a second housing configured to enclose the second battery string; and
wherein the fluid channel includes a second portion configured to extend through an interior of the second housing, the second thermal mixture being configured to flow through the second portion.

11. The assembly of claim 10, wherein:
the first portion and the second portion each define a substantially sinusoidal shape.

12. The assembly of claim 3, further comprising:
a pump configured to provide the fluid to the fluid channel;
wherein the heating unit includes a first condenser directly connected to the pump;
wherein the cooling unit includes an evaporator directly connected to the pump;
an auxiliary circuit configured to circulate an auxiliary substance between the heating unit and the cooling unit such that the auxiliary substance is in thermal communication with the fluid but does not physically mix; and
wherein the auxiliary circuit includes a compressor and a second condenser.

13. A method for controlling a first current produced by a first battery string and a second current produced by a second battery string, in an assembly having a fluid channel with a fluid flowing within, a heating unit, a cooling unit, a first mixer, a second mixer, a controller and at least one sensor, the first battery string and the second battery string being connected in parallel, operable at first and second temperatures, respectively, the method comprising:
determining respective strength status of the first and the second battery strings, via the controller;
determining a desired temperature differential between the first and the second temperatures based at least partially on the respective strength status and respective target currents for the first and second battery strings, via the controller;
warming a portion of the fluid, via the heating unit, to produce a warming fluid;
cooling another portion of the fluid, via the cooling unit, to produce a cooling fluid;
mixing the warming fluid and the cooling fluid in a first proportion, via the first mixer, to make a first thermal mixture;
mixing the warming fluid and the cooling fluid in a second proportion, via the second mixer, to make a second thermal mixture;
determining the first proportion and the second proportion based at least partially on the desired temperature differential; and
controlling the first and second currents by commanding the first mixer to direct the first thermal mixture through the first battery string in order to allow heat transfer between the first thermal mixture and the first battery string, and commanding the second mixer to direct the second thermal mixture through the second battery string in order to allow heat transfer between the second thermal mixture and the second battery string.

14. The method of claim 13, further comprising:
obtaining sensor feedback from the at least one sensor; and
adjusting the first and the second proportions based on the sensor feedback such that the first current and the second current converge.

15. The method of claim 14, further comprising a thermal management unit in the controller configured to:
control the first proportion such that the first temperature is within a first range defined by a first maximum and a first minimum; and
control the second proportion such that the second temperature is within a second range defined by a second maximum and a second minimum.

16. The method of claim 13, wherein the first and the second battery strings define a first strength status and a second strength status, respectively, and further comprising:
adjusting the first and the second proportions such that the first current is proportional to the first strength status and the second current is proportional to the second strength status.

17. A battery assembly comprising:
a first battery string including a first plurality of cells connected in series, the first battery string operable at a first temperature and configured to produce a first current;
a second battery string connected in parallel to the first battery string and including a second plurality of cells connected in series, the second battery string being operable at a second temperature and configured to produce a second current;
a fluid channel operatively connected to the first and the second battery strings and including a fluid flowing within;
a heating unit operatively connected to the fluid channel and configured to warm a portion of the fluid to produce a warming fluid;
a cooling unit operatively connected to the fluid channel and configured to cool another portion of the fluid to produce a cooling fluid;

a first mixer operatively connected to the fluid channel and configured to mix the warming fluid and the cooling fluid in a first proportion to make a first thermal mixture;

wherein the first thermal mixture is configured to be in fluid communication with the first battery string such that heat transfer between the first thermal mixture and the first battery string is enabled;

a second mixer operatively connected to the fluid channel and configured to mix the warming fluid and the cooling fluid in a second proportion to make a second thermal mixture;

wherein the second thermal mixture is configured to be in fluid communication with the second battery string such that heat transfer between the second thermal mixture and the second battery string is enabled;

a controller operatively connected to the first and second battery strings;

wherein the controller includes a processor and tangible, non-transitory memory on which is recorded instructions, execution of the instructions by the processor causing the controller to:

determine respective strength status of the first and the second battery strings;

determine a desired temperature differential between the first and the second temperatures based at least partially on the respective strength status and respective target currents for the first and the second battery strings;

determine the first proportion and the second proportion based at least partially on the desired temperature differential; and control the first and second currents by commanding the first and second mixers to direct the warming fluid and the cooling fluid to pass through in the first and second proportions, respectively.

18. The assembly of claim 17, further comprising:

a first current sensor and a second current sensor configured to measure the first and second currents, respectively; and wherein the controller is configured to adjust the first and the second proportions based on feedback from the first and the second current sensor.

* * * * *